(12) United States Patent
Kuroda

(10) Patent No.: US 7,680,203 B2
(45) Date of Patent: Mar. 16, 2010

(54) WIRELESS COMMUNICATION APPARATUS AND WIRELESS COMMUNICATION METHOD

(75) Inventor: Shinichi Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 782 days.

(21) Appl. No.: 11/385,755

(22) Filed: Mar. 22, 2006

(65) Prior Publication Data

US 2006/0269006 A1  Nov. 30, 2006

(30) Foreign Application Priority Data

Mar. 29, 2005  (JP) ............................ P2005-096352

(51) Int. Cl.
H04B 7/02   (2006.01)
(52) U.S. Cl. ................................. 375/267
(58) Field of Classification Search ............... 370/334, 370/344, 436, 477; 375/148, 260, 267
See application file for complete search history.

(56) References Cited

U.S. PATENT DOCUMENTS

2001/0053143 A1* 12/2001 Li et al. .................... 370/344
2004/0192218 A1* 9/2004 Oprea ......................... 455/73
2005/0069060 A1 3/2005 Saito
2006/0291581 A1* 12/2006 Onggosanusi et al. ....... 375/267

FOREIGN PATENT DOCUMENTS

JP        2002-44051      2/2002
WO    WO 2004/019514     3/2004

* cited by examiner

Primary Examiner—David C Payne
Assistant Examiner—Leon-Viet Q Nguyen
(74) Attorney, Agent, or Firm—Finnegan, Henderson, Farabow, Garrett & Dunner, L.L.P.

(57) ABSTRACT

A wireless communication apparatus for receiving spatially multiplexed signals in which a plurality of streams are spatially multiplexed, using a plurality of antennas, includes the following elements: a channel matrix estimator for estimating a channel matrix for multiplexed channels; a spatial decoder for spatially decoding received signals each of which has been received by a corresponding antenna so as to separate the received signals into individual stream signals by obtaining an antenna weight matrix from the estimated channel matrix, and then multiplying each received signal by the antenna weight matrix; a likelihood information estimator for estimating likelihood information using the estimated channel matrix, the antenna weight matrix, and estimated noise power; and a soft decision decoder for performing soft decision decoding on each stream signal on the basis of the estimated likelihood information.

6 Claims, 11 Drawing Sheets

WIRELESS COMMUNICATION APPARATUS AND WIRELESS COMMUNICATION METHOD

CROSS REFERENCES TO RELATED APPLICATIONS

The present invention contains subject matter related to Japanese Patent Application JP 2005-096352 filed in the Japanese Patent Office on Mar. 29, 2005, the entire contents of which are incorporated herein by reference.

BACKGROUND OF THE INVENTION

1. Field of the Invention

The present invention relates to a wireless communication apparatus and a wireless communication method for performing spatially multiplexed communication using a plurality of logical channels formed by a pair of a transmitter and a receiver each having a plurality of antennas. In particular, the present invention relates to a wireless communication apparatus and a wireless communication method for a MIMO (Multiple Input Multiple Output) communication scheme in which, on the basis of channel characteristics, spatially multiplexed signals are synthesized in accordance with the MIMO scheme and are then separated into individual signals on a stream-by-stream basis.

More particularly, the present invention relates to a wireless communication apparatus and a wireless communication method for spatially decoding spatially multiplexed signals into individual stream signals by synthesizing them in accordance with the MIMO scheme, using an antenna weight matrix W obtained from an estimated channel matrix H in accordance with an MMSE (Minimum Mean Square Error) algorithm. In particular, the present invention relates to a wireless communication apparatus and a wireless communication method for performing accurate likelihood estimation in a MIMO receiver that employs the MMSE algorithm.

2. Description of the Related Art

Wireless networks have attracted attention as a system for relieving users from the necessity of using wiring according to a known wire communication scheme. One of the standards related to wireless networks is IEEE (Institute of Electrical and Electronics Engineers) 802.11.

The IEEE 802.11a standard supports a modulation scheme that achieves a maximum communication speed of 54 Mbps. However, there is a demand for a wireless standard capable of realizing a higher bit rate. As one of the methods of accelerating wireless communication, MIMO (Multi-Input Multi-Output) communication has attracted attention. MIMO communication is communication that realizes spatially multiplexed transmission channels (hereinafter referred to as "MIMO channels") by providing both a transmitter and a receiver with a plurality of antennas. The MIMO transmitter distributes transmission data and then transmits the distributed transmission data to a plurality of antennas of the transmitter. The MIMO receiver receives space signals from a plurality of antennas and then performs signal processing on the received signals, thereby acquiring each signal without crosstalk (see, for example, Japanese Unexamined Patent Application Publication No. 2002-44051).

According to the MIMO communication scheme, transmission capacity increases with the number of antennas without the need for broadening a frequency band, thereby achieving an enhancement of communication speed. In addition, since the MIMO communication scheme employs spatial multiplexing, frequency usage efficiency can be improved. The MIMO communication scheme is a communication scheme that uses channel characteristics, thus it is not the same as a transmitting/receiving adaptive array communication scheme.

FIG. 11 is a conceptual diagram of a MIMO communication system. As illustrated in FIG. 11, a transmitter and a receiver each has a plurality of antennas. The transmitter multiplexes a plurality of pieces of transmission data by performing space-time coding on the data. The coded data is distributed to M transmitting antennas and then transmitted to MIMO channels. The receiver receives signals via the MIMO channels from N receiving antennas, and then performs space-time decoding on the received signals, thereby enabling the acquirement of received data. It is desirable that the number of MIMO streams to be formed corresponds to the smaller number of either transmitting antennas or receiving antennas (MIN[M, N]).

Generally, each MIMO channel has a configuration that includes radio wave propagation environments around a transmitter and a receiver (transfer functions) and a configuration of channel space (transfer function). Although crosstalk occurs when signals to be transmitted from each antenna are multiplexed, a receiver can correctly acquire each multiplexed signal without crosstalk by performing receiving processing.

The MIMO receiver can acquire each stream signal x by the following procedure: acquiring a channel matrix H in some way; obtaining an antenna weight matrix W using the channel matrix H in accordance with a predetermined algorithm; and multiplying the antenna weight matrix W by each spatially multiplexed received signal y. In other words, the MIMO receiver can spatially separate or spatially decode the received signals.

$$\hat{x}=Wy \qquad (1)$$

For example, the transmitter transmits a reference signal including a known training series. Using the reference signal, the receiver can acquire the channel matrix H.

As relatively simple algorithms for obtaining the antenna weight matrix W using the channel matrix H, zero-forcing and MMSE (Minimum Mean Square Error) algorithms are known. Zero-forcing is a method based on the logic of completely removing crosstalk. On the other hand, MMSE is a method based on the logic of maximizing the ratio of signal power to a square error (the sum of crosstalk power and noise power). This MMSE method introduces the concept of noise power of the receiver, wherein crosstalk is intentionally generated to obtain the antenna weight matrix W. Comparing both algorithms, it is known that the MMSE algorithm is superior in a high-noise environment.

Generally, in these zero-forcing and MMSE algorithms, the value of signal amplitude of a signal to be received after spatial decoding is obtained so as to be equal to about unity. Consequently, the value of signal amplitude of the post-spatial-decoding received signal is approximately about unity. At this point, the strength information of the received signal, that is, pseudo SNR information, is lost. Accordingly, some likelihood information needs to be provided to a soft decision decoder.

For example, in the zero-forcing, the following equation (2) is generally used to obtain a post-spatial-decoding SNR relative estimate. This equation is based on the fact that the square norm of the weight vector of each stream becomes equal to the gain of noise power with the expectation that the expected value of post-spatial-decoding signal amplitude regularly becomes equal to unity.

$$SNR_{ZF}(l) = \frac{1}{\|\dot{w}_l\|^2} \qquad (2)$$

$$\dot{w}_l = [\, w_{l1} \;\cdots\; w_{ln} \;\cdots\; w_{lN} \,] \qquad (3)$$

$$W = [\, \dot{w}_1 \;\cdots\; \dot{w}_l \;\cdots\; \dot{w}_L \,]^T \qquad (4)$$

l: stream serial number n: receiving branch serial number receiving branches

W: antenna weight matrix $\dot{w}_l$: antenna weight vector of l-th stream

L: number of streams

N: number of receiving branches

The above equation (3) shows that an antenna weight vector of an l-th stream is a vector including an antenna weight $w_{ln}$ between the l-th stream and each receiving branch n as an element. The above equation (4) shows that an antenna weight matrix W is a transposed matrix of the matrix including the antenna weight vector on a stream-by-stream basis as a row vector. Gain associated with spatial decoding processing in each stream is the square norm of the antenna weight vector of the stream. In the above equation (2), the SNR of the l-th stream after spatial decoding is obtained as the reciprocal number of the square norm of the antenna weight vector of the stream.

Finally, the value of the square root of the SNR estimate shown in the following equation (5) is sent to the soft decision decoder as a likelihood amplitude. As is clear from the above equation (2), such likelihood information is estimated by using only the antenna weight matrix.

$$Y = \sqrt{SNR_{ZF}(l)} \qquad (5)$$

On the other hand, in the MMSE algorithm, crosstalk (interference between streams) is intentionally generated when calculating the antenna weight matrix, and the expected value of signal amplitude after spatial decoding is not limited to unity. In view of these facts, it is considered difficult to expect accuracy from the likelihood estimate obtained by using only the antenna weight matrix as shown in the above equation (2).

This inaccurate likelihood estimation causes the degradation of decoding characteristics of the soft decision decoder, and consequently has an effect on the performance of the entire receiver.

SUMMARY OF THE INVENTION

It is desirable to provide a superior wireless communication apparatus and a superior wireless communication method for preferably spatially decoding spatially multiplexed signals into individual stream signals by synthesizing them in accordance with a MIMO scheme, using an antenna weight matrix W obtained from an estimated channel matrix H in accordance with an MMSE algorithm.

It is further desirable to provide a superior wireless communication apparatus and a superior wireless communication method for achieving highly reliable likelihood estimation in a MIMO receiver that employs the MMSE algorithm, and consequently preventing the performance degradation of the entire receiver.

According to an embodiment of the present invention, there is provided a wireless communication apparatus for receiving spatially multiplexed signals in which a plurality of streams are spatially multiplexed, using a plurality of antennas. The wireless communication apparatus includes the following elements: a channel matrix estimator for estimating a channel matrix for spatially multiplexed channels; a spatial decoder for spatially decoding received signals each of which has been received by a corresponding antenna so as to separate the received signals into individual stream signals by obtaining an antenna weight matrix from the estimated channel matrix, and then multiplying each received signal by the antenna weight matrix; a likelihood information estimator for estimating likelihood information using the estimated channel matrix, the antenna weight matrix, and estimated noise power; and a soft decision decoder for performing soft decision decoding on each stream signal on the basis of the estimated likelihood information.

The present invention relates to a MIMO communication scheme in which a pair of a transmitter and a receiver, each having a plurality of antennas, performs transmission of spatially multiplexed signals. The MIMO receiver can acquire each stream signal x by the following procedure: acquiring a channel matrix H in some way; obtaining an antenna weight matrix W using the channel matrix H in accordance with a predetermined algorithm; and multiplying the antenna weight matrix W by each spatially multiplexed received signal y. In other words, the MIMO receiver can spatially separate or spatially decode the received signals.

As relatively simple algorithms for obtaining the antenna weight matrix W using the channel matrix H, zero-forcing and MMSE (Minimum Mean Square Error) algorithms are known. In both algorithms, since the strength information of a received signal, that is, pseudo SNR information, is lost at the time of spatial decoding, effective likelihood information needs to be provided to the soft decision decoder.

Comparing the zero-forcing algorithm with the MMSE algorithm, the MMSE algorithm, which introduces the concept of noise power of a receiver, is superior in a high-noise environment. However, in the MMSE algorithm, crosstalk is intentionally generated, and the expected value of signal amplitude after spatial decoding is not limited to unity. In view of these facts, a likelihood estimate acquired by using only the antenna weight matrix becomes inaccurate. This causes the degradation of the decoding performance of the soft decision decoder, and consequently has an effect on the performance of the entire receiver.

Accordingly, in the present invention, the likelihood information is estimated more accurately on the basis of three pieces of information such as the estimated channel matrix, the antenna weight matrix, and estimated noise power. After that, the estimated likelihood information is sent to the soft decision decoder. More specifically, each of signal power S, interference power I, and noise power N of each post-spatial-decoding stream signal is directly calculated using the estimated channel matrix, the antenna weight matrix, and the estimated noise power. Subsequently, the likelihood information obtained from the square root of S/(I+N) is sent to the soft decision decoder.

The noise power value included in each stream after spatial decoding can be obtained from the product of the square norm of the antenna weight vector of the stream, and noise power included in a pre-spatial-decoding signal.

The expected value of signal amplitude of each stream after spatial decoding can be obtained from the scalar product of an antenna weight vector and a channel vector of the stream. Accordingly, a true signal power estimate of the stream can be obtained by subtracting the noise power value from a power value that can be obtained from the square norm of the scalar product of the antenna weight vector and the channel vector of each stream. Alternatively, the value obtained from the square norm may be the signal power estimate without the subtraction of the noise power value.

The amplitude of an interference signal of each stream after spatial decoding can be obtained from the scalar product of the antenna weight vector of the stream and the channel vectors of the other streams. Accordingly, the interference signal power of the stream can be obtained from the total sum of the square norms of these scalar products.

Thus, the MIMO receiver according to an embodiment of the present invention directly estimates each of the noise power, the signal power, and the interference power of each post-spatial-decoding stream signal, using not only the antenna weight matrix W but also the noise power estimate $\sigma_r^2$ used in MMSE processing (that is, the noise power estimate included in a received signal before spatial decoding), and the estimated channel matrix, and then obtains an SINR from these estimates. Accordingly, likelihood amplitude information obtained from the square root of the SINR can be used in soft decision processing as highly reliable likelihood information.

The likelihood information estimator may multiply the estimated likelihood amplitude value by each post-spatial-decoding stream signal. In this case, an effect similar to that obtained by directly sending likelihood information to the soft decision decoder can be obtained.

In a MIMO communication system jointly employing an OFDM communication scheme, the spatial decoder separates received signals having been Fourier transformed into individual stream signals by multiplying each received signal by the antenna weight matrix. In this case, the advantages of the present invention do not change.

In addition, in an embodiment of the present invention, each stream signal, which can be acquired by spatial decoding, is demapped, and then the demapped stream signals are parallel-to-serial converted into one stream signal by data synthesis. Soft decision decoding is performed on the parallel-to-serial converted stream signal. However, the advantages of the present invention can also be achieved by performing the soft decision decoding on each stream signal.

According to an embodiment of the present invention, there can be provided a superior wireless communication apparatus and a superior wireless communication method for preferably spatially decoding spatially multiplexed signals into individual stream signals by synthesizing them in accordance with a MIMO scheme, using an antenna weight matrix W obtained from an estimated channel matrix H in accordance with the MMSE algorithm.

Furthermore, according to an embodiment of the present invention, there can be provided a superior wireless communication apparatus and a superior wireless communication method for preventing the performance degradation of an entire receiver by achieving highly reliable likelihood estimation in a MIMO receiver that employs the MMSE algorithm.

Other objects, characteristics, and advantages of the present invention will become apparent from more detailed descriptions based on the following embodiment of the present invention and the accompanying drawings.

DESCRIPTION OF THE PREFERRED EMBODIMENT

An embodiment of the present invention will be described in detail with reference to the accompanying drawings.

The present invention relates to MIMO communication in which a pair of a transmitter and a receiver, each having a plurality of antennas, performs transmission of spatially multiplexed signals. In a MIMO communication scheme, a transmitter distributes transmission data and then transmits the distributed data to a plurality of antennas of the transmitter. A receiver receives space signals from a plurality of antennas and then performs signal processing on the received signals, thereby acquiring each signal without crosstalk. According to the MIMO communication scheme, transmission capacity increases with the number of antennas without the need for broadening a frequency band, thereby enabling an enhancement of communication speed. In addition, since the MIMO communication scheme employs spatial multiplexing, higher frequency usage efficiency can be achieved.

Figure 1:
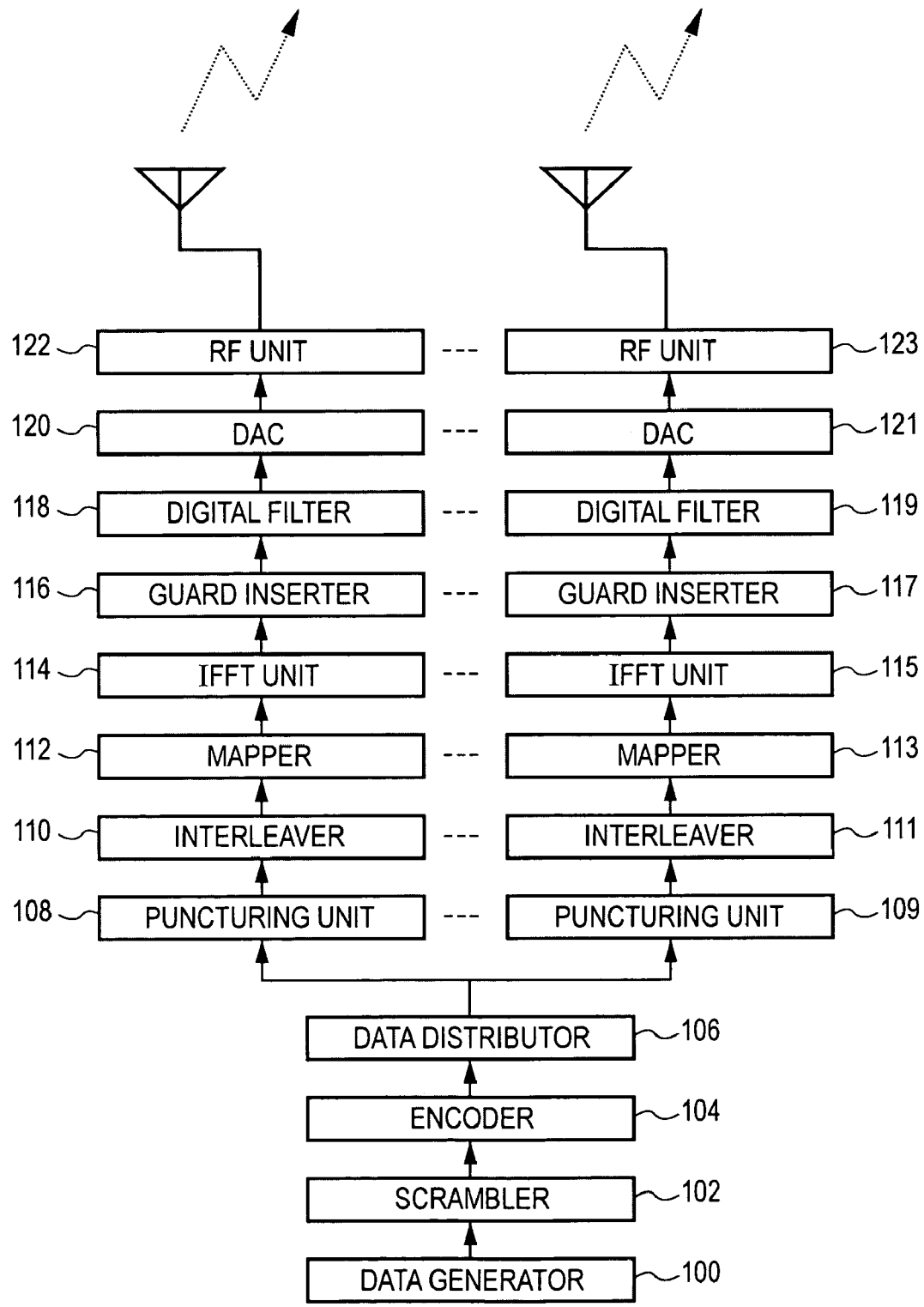
FIG. 1 illustrates a configuration of a MIMO transmitter according to an embodiment of the present invention.
Figure 2:
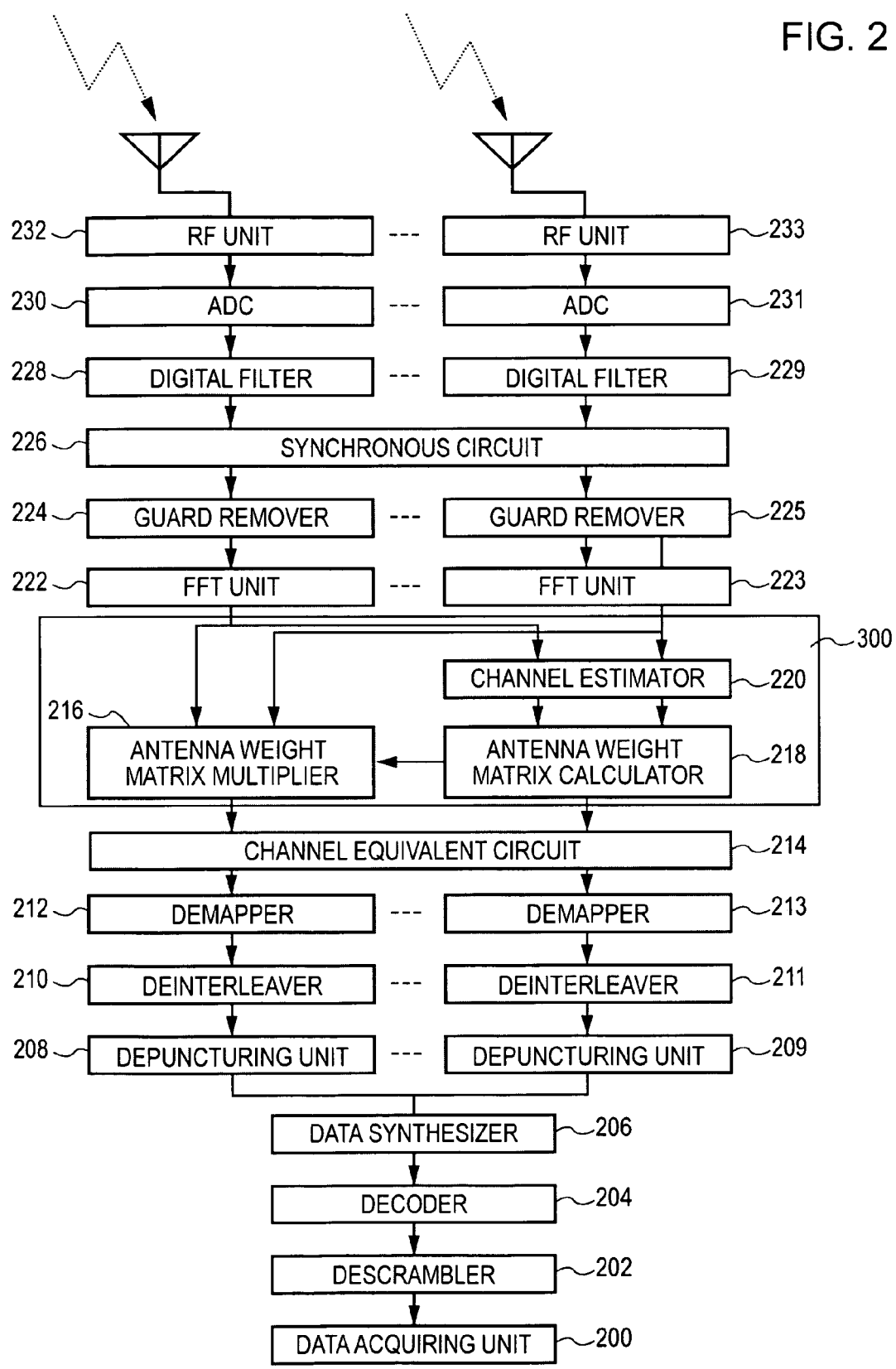
FIG. 2 illustrates a configuration of a MIMO receiver according to an embodiment of the present invention.

FIGS. 1 and 2 illustrate configurations of a MIMO transmitter and a MIMO receiver according to an embodiment of the present invention, respectively. Each transmitter and receiver has two antennas as illustrated in FIGS. 1 and 2, thus two transmit/receive streams are formed. However, the gist of the present invention is not limited to this number of streams.

The illustrated communication system is a MIMO-OFDM (Orthogonal Frequency Division Multiplexing) communication system jointly using an OFDM modulation scheme. The OFDM modulation scheme is a multicarrier transmission scheme in which the frequency of each subcarrier is set to allow each subcarrier to be orthogonal to the other subcarriers in a symbol segment. Each subcarrier being orthogonal to the other subcarriers means that a peak point of a spectrum of a predetermined subcarrier typically corresponds to zero points of spectrums of other subcarriers. According to the OFDM modulation scheme, frequency usage efficiency can be extremely high, and the robustness against frequency selective fading can be achieved as known in the art.

Transmission data supplied by a data generator 100 is scrambled in a scrambler 102. Subsequently, an encoder 104 performs error-correction coding on the scrambled transmission data. As a kind of encoder, for example, a convolutional encoder of R=1/2 and K=7 is employed in the case of IEEE 802.11a. The coded signal is input into a data distributor 106 and then distributed to each stream.

In each MIMO transmit stream, a puncturing unit 108 or 109 punctures a transmit signal in accordance with a data rate provided to each stream. An interleaver 110 or 111 interleaves the punctured transmit signal. A mapper 112 or 113 maps the interleaved transmit signal in an IQ signal space, whereby the signal becomes a complex baseband signal. An IFFT unit 114 or 115 converts each subcarrier arranged in a frequency domain into a time axis signal. A guard inserter 116 or 117 inserts a guard interval into the time axis signal. A digital filter 118 or 119 band-limits the signal. A DA converter 120 or 121 converts the band-limited signal into an analog signal. An RF unit 122 or 123 up-converts the analog signal to an appropriate frequency band. Finally, the up-converted analog signal is transmitted from each antenna to a propagation path.

The MIMO receiver receives data through MIMO channels. An RF unit 232 or 233 performs analog processing on the received data. An AD converter 230 or 231 converts the processed data into a digital signal. The digital signal is input into a digital filter 228 or 229. A synchronous circuit 226 performs such processing on the signal as packet finding, timing detection, and frequency offset compensation. A guard remover 224 or 225 removes a guard interval attached to the head of a data transmission segment from the signal. An FFT unit 222 or 223 converts the time axis signal into a frequency axis signal.

An antenna weight matrix calculator 218 calculates an antenna weight matrix W using an estimated channel matrix H in accordance with, for example, an MMSE algorithm. An antenna weight matrix multiplier 216 spatially decodes spatially multiplexed signals by matrix-multiplying original received signals by the antenna weight matrix W, thereby acquiring independent signal series on a stream-by-stream basis.

In this embodiment, likelihood information needed for soft decision decoding is obtained using the channel matrix H, the antenna weight matrix W, which are acquired in a MIMO processing section 300, and a noise power estimate $\sigma_r^2$ of noise power included in a pre-spatial-decoding received signal. This point will hereinafter be described in detail.

A channel equivalent circuit 214 performs residual frequency offset compensation, channel tracking, etc. on the signal series on a stream-by-stream basis. A demapper 212 or 213 demaps a received signal being in the IQ signal space. A deinterleaver 210 or 211 deinterleaves the demapped signal. A depuncturing unit 208 or 209 depunctures the deinterleaved signal at a predetermined data rate. A data synthesizer 206 synthesizes received signals on a MIMO receive stream-by-stream basis into one stream. In this data synthesizing processing, the exact reverse operation of the data distribution performed in the transmitter is performed. A decoder 204 error-correction-decodes the synthesized signal in accordance with soft decision processing. A descrambler 202 descrambles the error-correction-decoded signal. Through these above processes, a data acquiring unit 200 acquires received data.

Some methods of acquiring the channel matrix H in a channel estimator 220 can be considered. However, in this embodiment, a time division method is applied, wherein a transmitter transmits a training signal on a transmitting antenna-by-antenna basis in accordance with the time division method, and a receiver acquires the channel matrix H on the basis of the training signal received by each receiving antenna. When transmitting the training signal in accordance with the time division method, a tone interleaving operation may be performed, wherein the position, into which a training signal for each MIMO channel is inserted, is changed in each subcarrier. However, since the method of acquiring the channel matrix H is not directly related to the gist of the present invention, it will not be described any further.

As a relatively simple algorithm for obtaining the antenna weight matrix W using the channel matrix H in the antenna weight matrix calculator 218, the MMSE algorithm is employed. The MMSE method is based on the logic of maximizing the ratio of signal power to a square error (the sum of crosstalk power and noise power). The MMSE algorithm introduces the concept of noise power of the receiver, wherein crosstalk is intentionally generated to obtain the antenna weight matrix W. Accordingly the MMSE algorithm is suitable for a high-noise environment.

However, in the MMSE algorithm, the value of signal amplitude of a received signal after spatial decoding is generally obtained so as to be equal to about unity. Consequently, the value of the post-spatial-decoding signal amplitude is approximately about unity. At the point of the spatial decoding, the strength information of the received signal, that is, pseudo SNR information, is lost. Accordingly, effective likelihood information needs to be provided to a soft decision decoder 204. In addition, in the MMSE algorithm, crosstalk is intentionally generated, and the expected value of the post-spatial-decoding signal amplitude is not limited to unity. Therefore, the likelihood estimate obtained in accordance with a known likelihood estimation method using only the antenna weight matrix becomes inaccurate.

Accordingly, in this embodiment, the likelihood information is estimated more accurately on the basis of three pieces of information such as the estimated channel matrix, the antenna weight matrix, and estimated noise power. After that, the estimated likelihood information is sent to the soft decision decoder 204. More specifically, each of signal power S, interference power I, and noise power N of each post-spatial-decoding stream signal is calculated, using the estimated channel matrix, the antenna weight matrix, and the estimated noise power. Subsequently, the likelihood information obtained from the square root of S/(I+N) is sent to the soft decision decoder 204.

Figure 3:
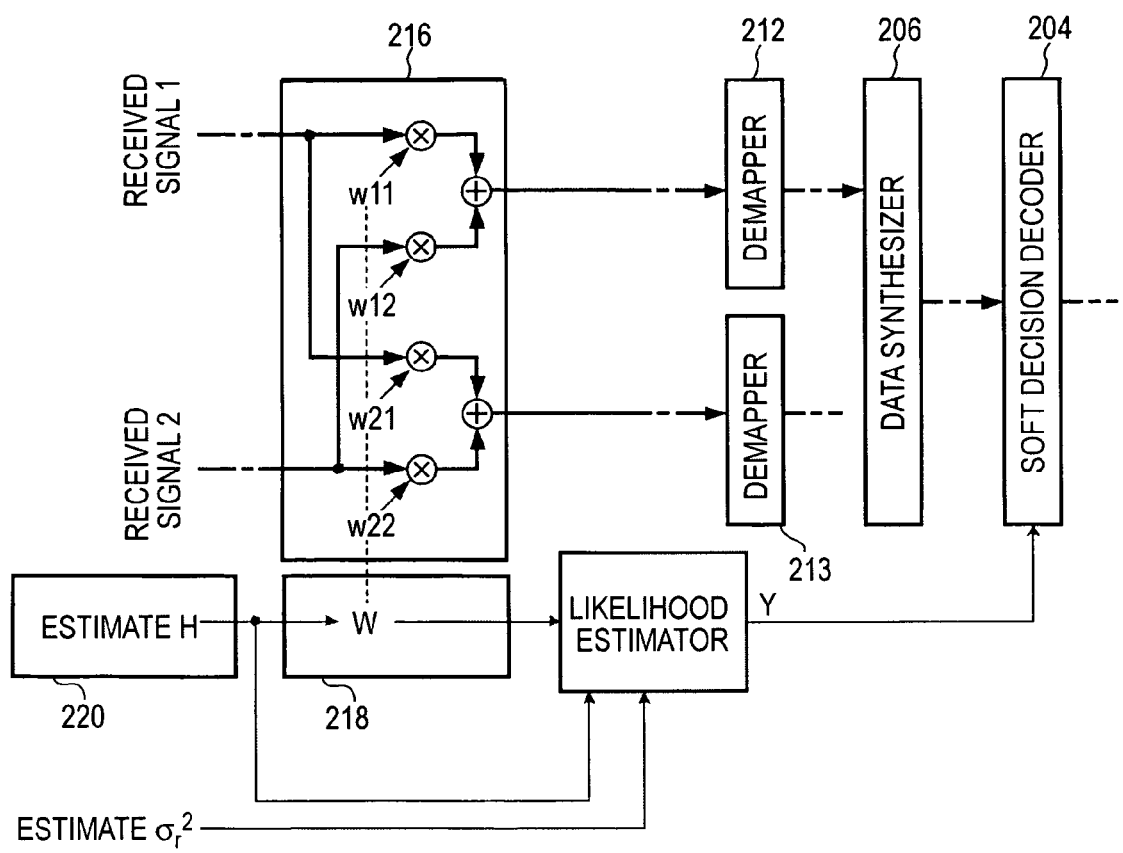
FIG. 3 illustrates a mechanism of likelihood estimation according to an embodiment of the present invention.

FIG. 3 illustrates a mechanism of likelihood estimation according to an embodiment of the present invention.

The antenna weight matrix calculator 218 acquires an antenna weight matrix W by, for example, performing an inverse matrix operation of a channel matrix H estimated in the channel estimator 220. The antenna weight matrix multiplier 216 spatially decodes received signals 1 and 2 from corresponding antennas so as to separate them into signals on a stream-by-stream basis by multiplying them by the antenna weight matrix. The demapper 212 or 213 demaps a received signal being in an IQ signal space, thereby acquiring an original data series. The data synthesizer 206 performs parallel-to-serial conversion on these data series on a stream-by-stream basis. The soft decision decoder 204 performs soft decision decoding on the acquired serial data series.

In this embodiment, a likelihood estimator has the inputs of three pieces of information such as the estimated channel matrix H, the antenna weight matrix W, and estimated noise power $\sigma_r^2$. Using these values, the likelihood estimator directly estimates each of noise power, signal power, and interference power of each post-spatial-decoding stream signal, and then obtains one SINR using these estimates.

$$SINR_{MMSE}(l) = \frac{\hat{S}_l}{\hat{I}_l + \hat{N}_l} \quad (6)$$

Subsequently, the likelihood estimator provides the soft decision decoder 204 with the likelihood amplitude information obtained from the square root of the calculated SINR.

$$Y = \sqrt{SINR_{MMSE}(l)} \quad (7)$$

The equations for directly obtaining each of the noise power, the signal power, and the interference power using the inputs of the estimated channel matrix H, the antenna weight matrix W, and the estimated noise power $\sigma_r^2$ are as follows.

$$\hat{N} = \|\dot{w}_l\|^2 \sigma_r^2 \quad (8)$$

$$\hat{S}_l = \|\dot{w}_l \cdot h_l\|^2 - \hat{N}_l \quad (9)$$

-continued $$\hat{i}_l = \sum_{i=1(i \neq l)}^{L} \left( \| \hat{w}_l \cdot h_l \|^2 \right) \quad (10)$$

$$\hat{h}_l = [h_{1l} \cdots h_{nl} \cdots w_{Nl}] \quad (11)$$

$$H = \left[ \hat{h}_1^T \cdots \hat{h}_l^T \cdots \hat{h}_N^T \right] \quad (12)$$

$\sigma_r^2$: estimated noise power of a spatially multiplexed signal
H: estimated channel matrix $\sigma_r^2$ denotes noise power included in a pre-spatial decoding received signal. Gain associated with spatial decoding processing in each stream is the square norm of the antenna weight vector of the stream. Accordingly, in the above equation (8), the value of noise power included in each stream after spatial decoding is obtained from the product of the square norm of the antenna weight vector of the stream, and the noise power included in a pre-spatial-decoding signal.

The above equation (11) shows that a channel vector of an l-th stream is a vector that includes a channel estimate $h_{nl}$ between each receiving branch n and the l-th stream as an element. The above equation (12) shows that a channel matrix H is a matrix including the transposed vector of the channel vector on a stream-by-stream basis as a column vector. The expected value of signal amplitude of each stream after spatial decoding can be obtained from the scalar product of the antenna weight vector and the channel vector of the stream. Although the square norm of the scalar product is the signal power of each stream after spatial decoding, this signal power value also includes noise power. Accordingly, in the above equation (9), a true signal power estimate of the stream is obtained from the subtraction of the noise power value, which is obtained using the above equation (8), from the power value, which is calculated from the square norm of the scalar product. Alternatively, the subtraction of the noise power value may be omitted.

The amplitude of an interference signal of each stream after spatial decoding can be obtained from the scalar product of the antenna weight vector of the stream and channel vectors of other streams. Accordingly, in the above equation (10), the interference signal power of the stream is obtained from the total sum of the square norms of these scalar products.

By substituting the noise power, the signal power, and the interference power obtained using the above equations (8), (9), and (10), respectively, into the above equation (6), the appropriate SINR value can be obtained when acquiring the antenna weight matrix in accordance with the MMSE algorithm. As shown in the above equation (7), the likelihood amplitude obtained from the square root of the SINR can be acquired as highly reliable likelihood information. Accordingly, even if in the case of the MMSE algorithm in which crosstalk is intentionally generated, relatively highly reliable likelihood information can be sent to the soft decision decoder 204, thereby enabling the prevention of the performance degradation of the entire receiver.

Figure 4:
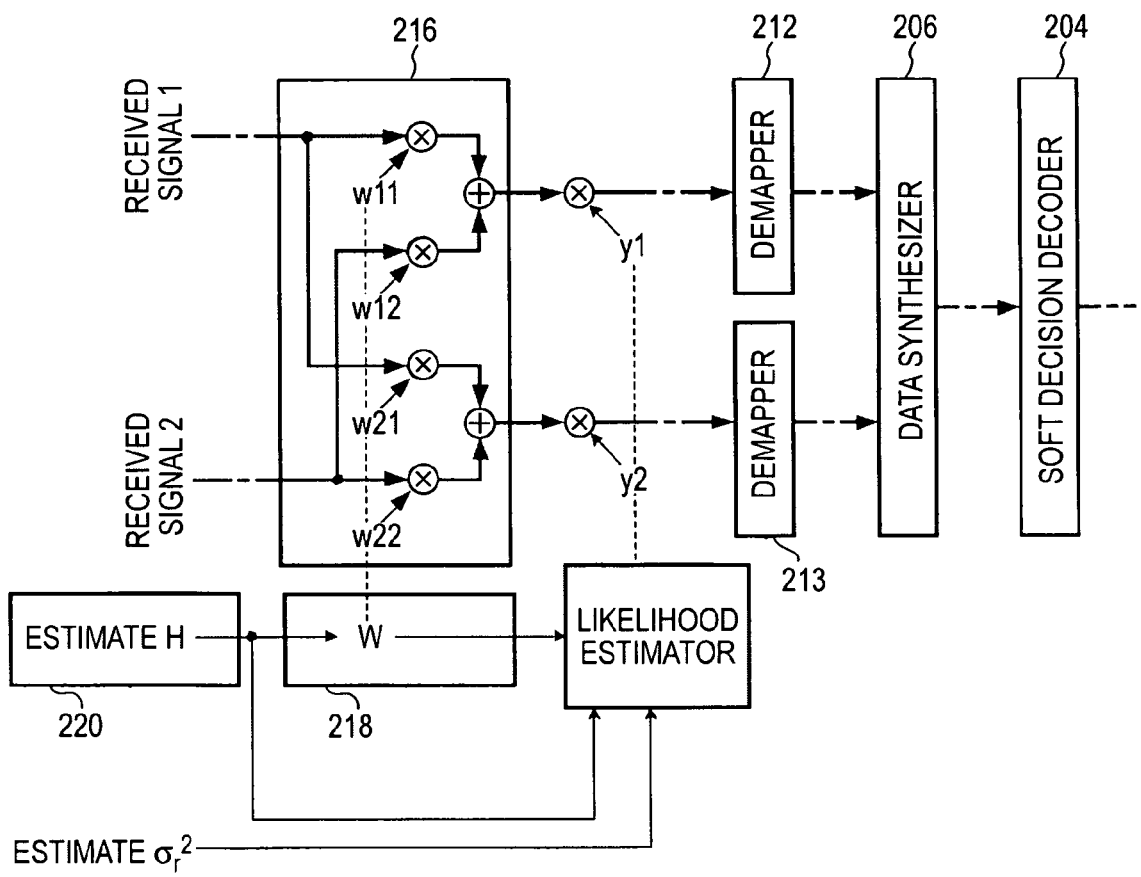
FIG. 4 illustrates a mechanism of likelihood estimation according to an embodiment of the present invention.

FIG. 4 illustrates an exemplary modification of a mechanism of likelihood estimation. In the example illustrated in FIG. 3, the likelihood estimator directly sends the estimated likelihood amplitude value to the soft decision decoder 204 at the subsequent stage. On the other hand, in FIG. 4, each post-spatial-decoding stream signal is multiplied by the estimated likelihood amplitude value. In this case, an effect similar to that obtained by directly sending the value to the soft decision decoder 204 can be obtained.

Figure 5:
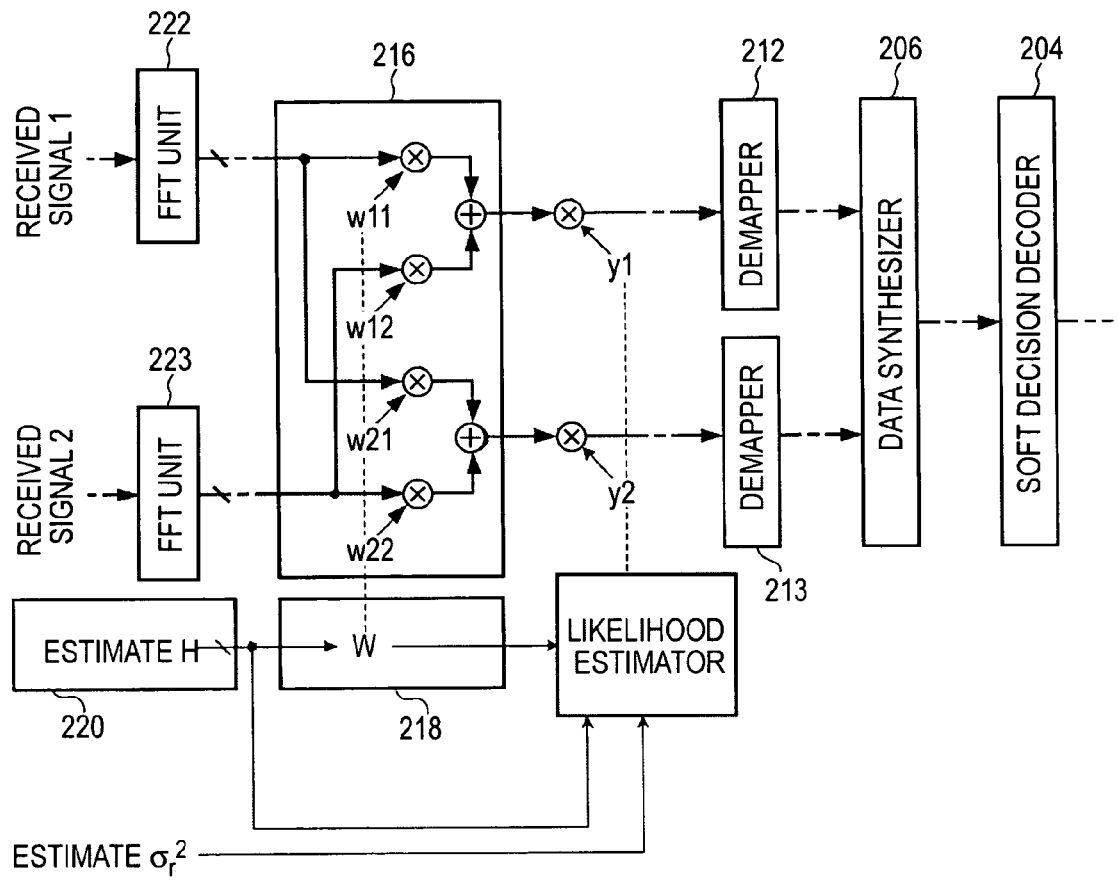
FIG. 5 illustrates a mechanism of likelihood estimation according to an embodiment of the present invention.

As illustrated in FIGS. 1 and 2, a MIMO communication system according to this embodiment jointly employs an OFDM communication scheme. In this case, as illustrated in FIG. 5, spatial decoding is performed on the received signal on which FFT has been performed. However, in this case, the advantages of the present invention do not change.

Figure 6:
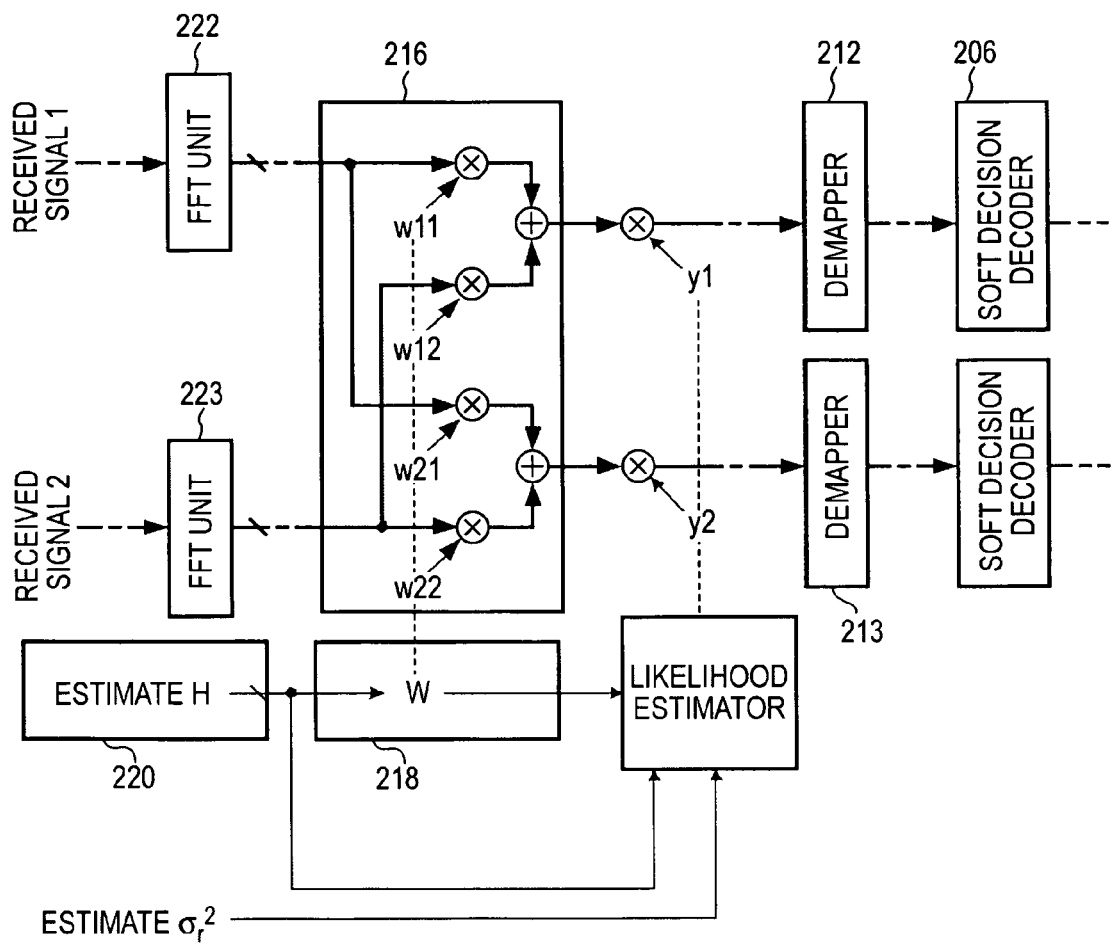
FIG. 6 illustrates a mechanism of likelihood estimation according to an embodiment of the present invention.

FIG. 6 illustrates another exemplary modification of a mechanism of likelihood estimation. In examples illustrated in FIGS. 3, 4, and 5, each stream signal, which can be obtained by spatial decoding, is demapped, and then the demapped stream signals are parallel-to-serial converted into one stream signal by data synthesis. Subsequently, soft decision decoding is performed on the synthesized data. On the other hand, as illustrated in FIG. 6, the soft decision decoding is performed on each stream signal. In this case, the advantages of the present invention can likewise be achieved.

Finally, FIGS. 7 through 10 illustrate some exemplary simulation results in order to demonstrate the advantages of the present invention. These results are the calculation results of PER (packet error rate) characteristics of an MMSE-MIMO receiver that complies with the specifications of IEEE 802.11 a/g (OFDM modulation scheme of subcarrier spacing: 312.5 KHz, number of subcarriers: 52).

Figure 7:
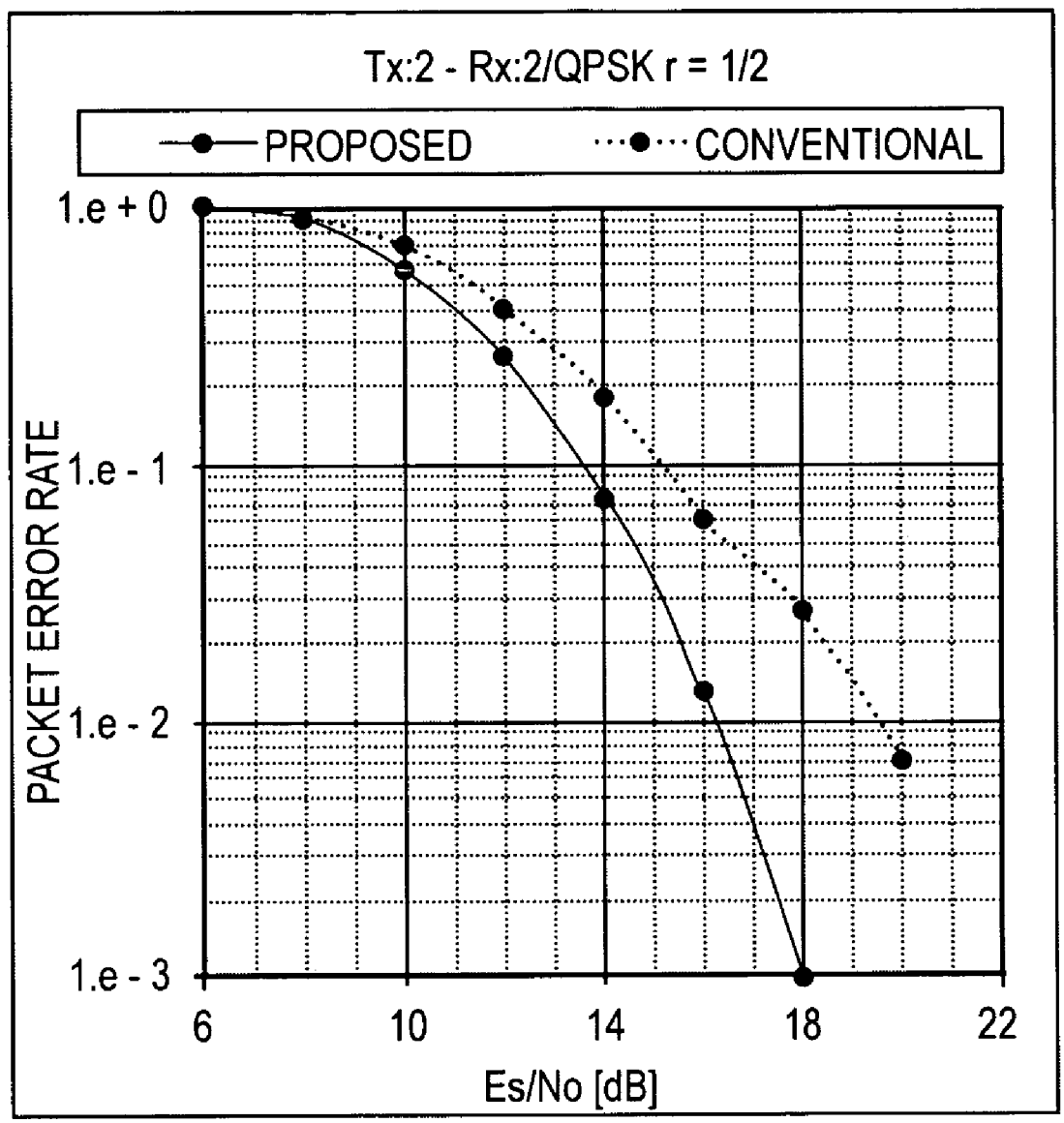
FIG. 7 illustrates a result of a PER characteristics simulation of an MMSE-MIMIO receiver complying with IEEE 802.11 a/g specifications.
Figure 8:
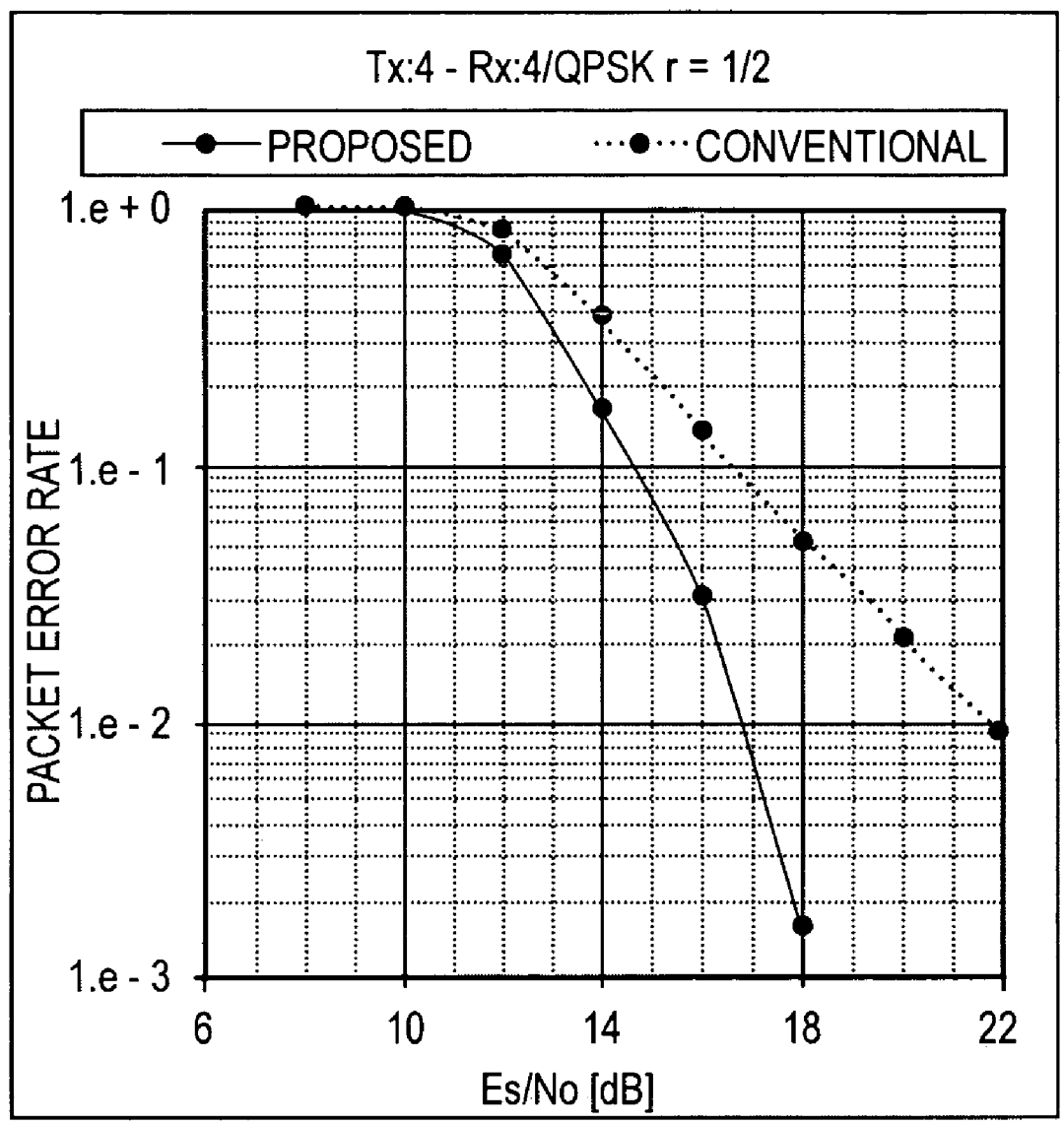
FIG. 8 illustrates a result of a PER characteristics simulation of an MMSE-MIMIO receiver complying with IEEE 802.11 a/g specifications.
Figure 9:
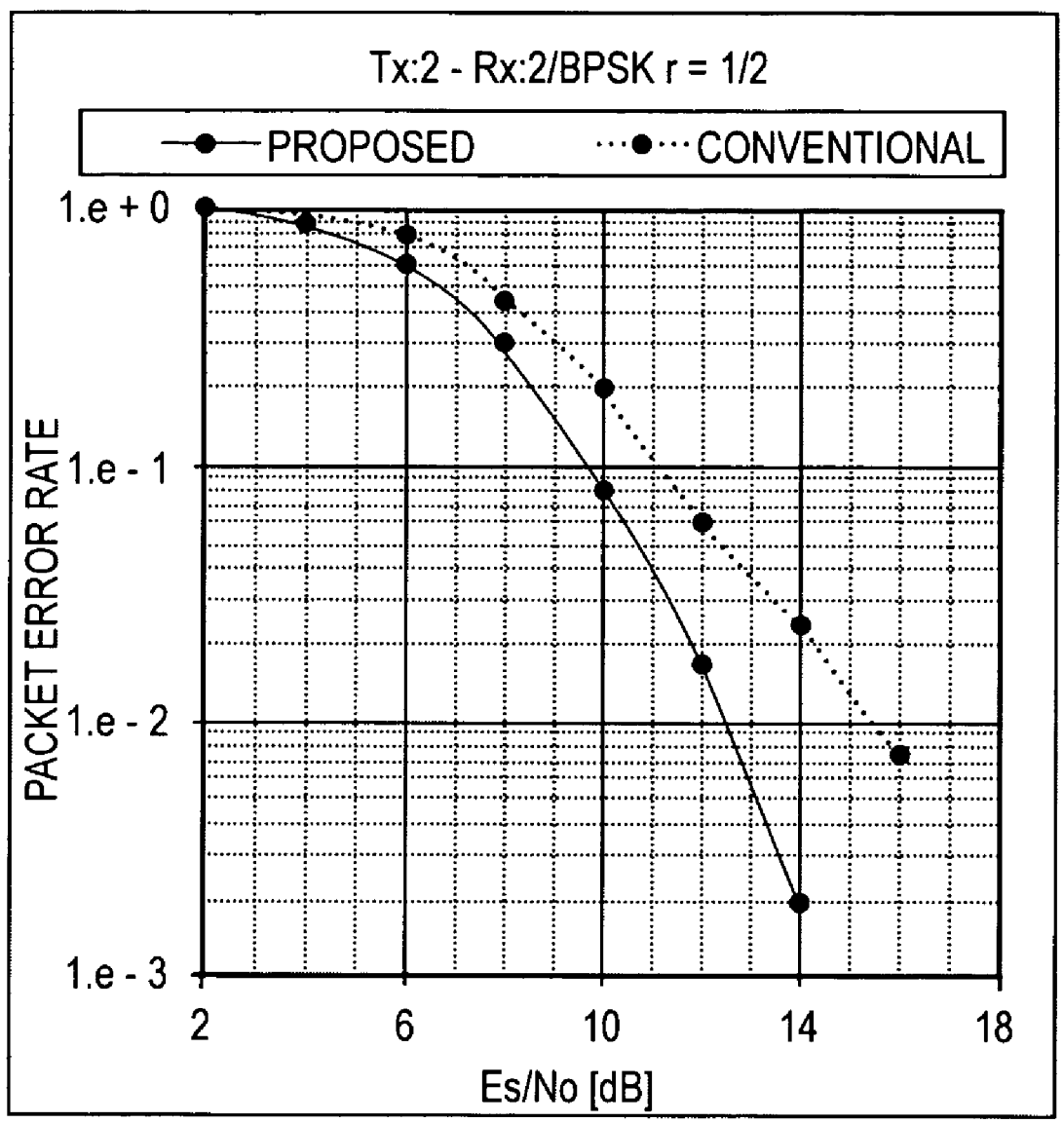
FIG. 9 illustrates a result of a PER characteristics simulation of an MMSE-MIMIO receiver complying with IEEE 802.11 a/g specifications.
Figure 10:
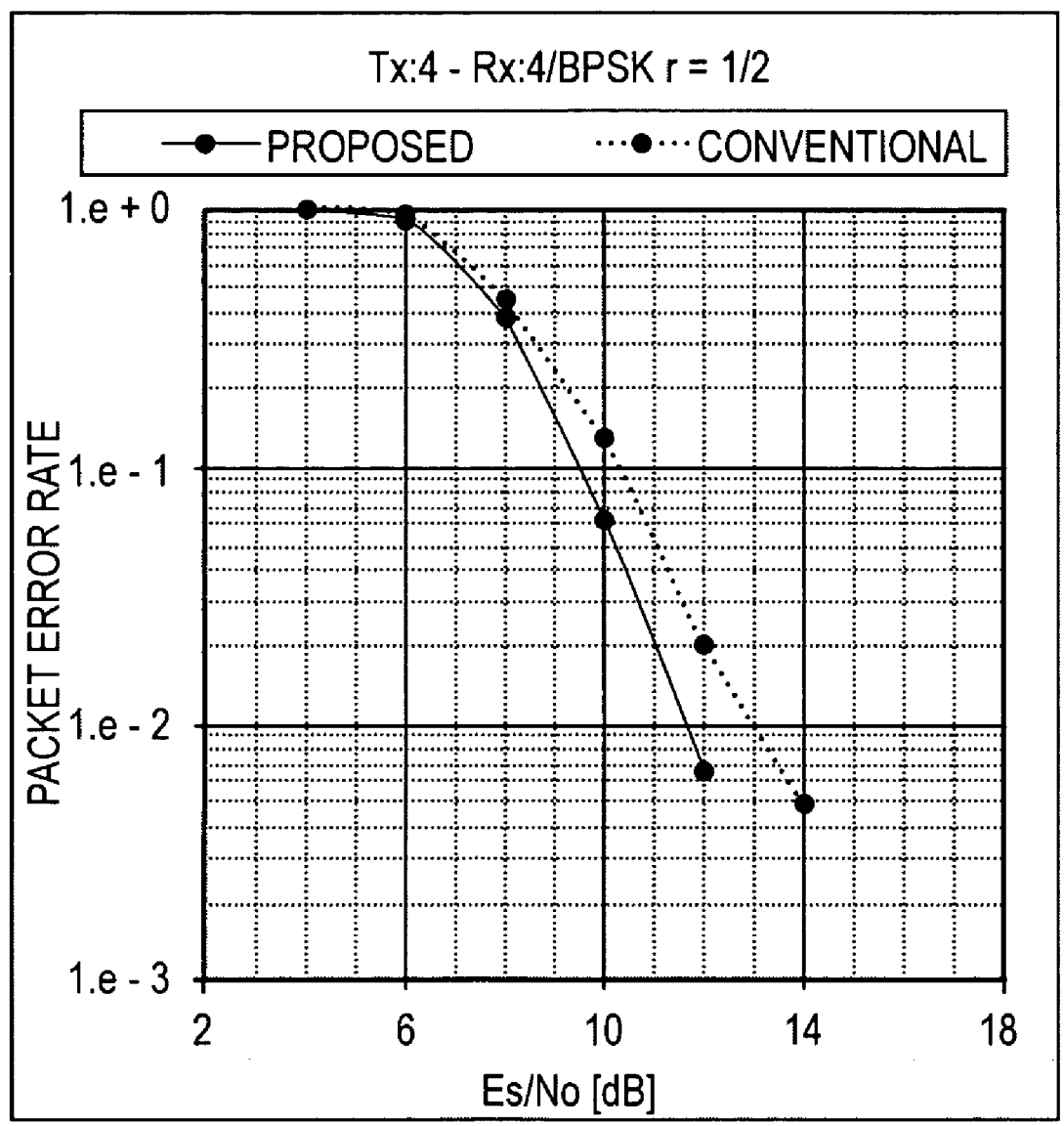
FIG. 10 illustrates a result of a PER characteristics simulation of an MMSE-MIMIO receiver complying with IEEE 802.11 a/g specifications.
Figure 11:
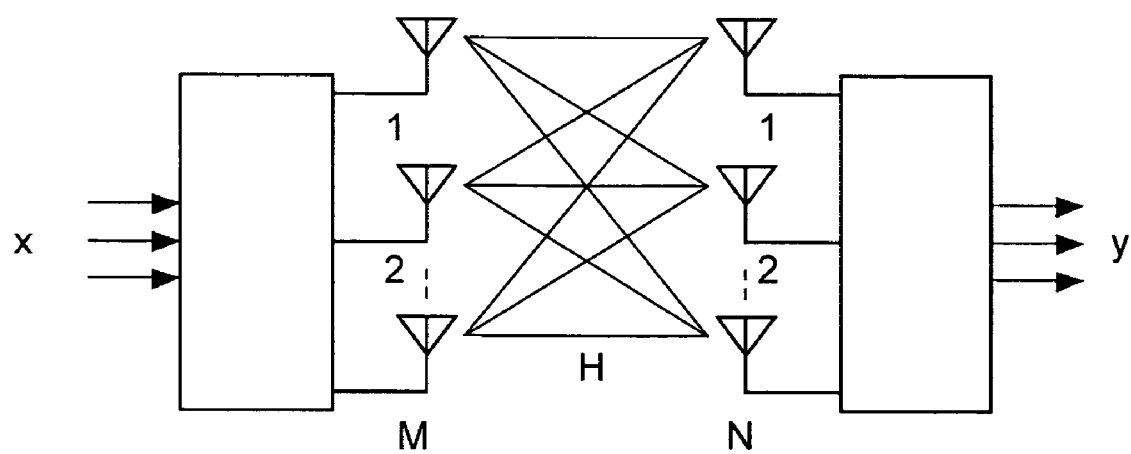
FIG. 11 is a conceptual diagram of a MIMO communication system.

FIG. 7 illustrates the result of QPSK with two transmitting antennas and two receiving antennas (that is, two streams). FIG. 8 illustrates the result of QPSK with four transmitting antennas and four receiving antennas (that is, four streams). FIG. 9 illustrates the result of BPSK with two transmitting antennas and two receiving antennas (that is, two streams). FIG. 10 illustrates the result of BPSK with four transmitting antennas and four receiving antennas (that is, four streams). Packet length is 1000 bites, and the channel model used for the simulations is Channel-D defined in IEEE 802.11n. As is clear from each drawing, in the case of employing a likelihood estimation method according to this embodiment (Proposed), the improved effect of about 1.5-5 dB can be shown compared with a conventional likelihood estimation method (Conventional) at PER=1%.

The present invention has been described in detail with reference to one particular embodiment. However, it is obvious that modifications and substitutions may be made to the present invention by those skilled in the art without departing from the spirit and the scope thereof.

In this specification, the embodiment, in which the present invention is applied to the MIMO communication system that employs the MMSE algorithm for acquiring an antenna weight matrix, has been mainly described. However, the gist of the present invention is not limited to this embodiment. The advantages of the present invention can also be obtained in a MIMO communication system that employs another algorithm for obtaining an antenna weight taking noise power into consideration.

In other words, the present invention has been disclosed by way of an example, and the present invention should not be construed as being limited to this embodiment. In order to determine the gist of the present invention, the claims should be referred to.

What is claimed is:

1. A wireless communication apparatus for receiving spatially multiplexed signals via respective antennas, comprising:

a channel matrix estimator for estimating a channel matrix for spatially multiplexed channels;

a spatial decoder for decoding the received spatially multiplexed signals into respective individual stream signals by obtaining an antenna weight matrix from the estimated channel matrix, and multiplying the received spatially multiplexed signals by the antenna weight matrix;

a likelihood information estimator for estimating, for each decoded stream signal, likelihood information according to the following equations:

$$\hat{N}_l = \|\dot{w}_l\|^2 \sigma_r^2,$$

$$\hat{S}_l = \|\dot{w}_l \cdot h_l\|^2 - \hat{N}_l, \text{ and}$$

$$\hat{I}_l = \sum_{i=l(i \neq 1)}^{L} \|\dot{w}_l \cdot h_l\|^2 \sigma_r^2,$$

where $\hat{N}_l$ is the noise power of the decoded stream signal, $\hat{S}_l$ is the signal power of the decoded stream signal, $\hat{I}_l$ is the interference power of the decoded stream signal, $h_l$ is a channel vector for the decoded stream signal from the estimated channel matrix, $\dot{w}_l$ is an antenna weight vector for the decoded stream signal from the antenna weight matrix, and $\sigma_r^2$ is an estimated noise power of a respective spatially multiplexed signal; and a soft decision decoder for performing soft decision decoding on each stream signal based on the respective estimated likelihood information.

2. The wireless communication apparatus according to claim 1, wherein the spatial decoder obtains the antenna weight matrix in accordance with an MMSE (Minimum Mean Square Error) algorithm by maximizing a ratio of signal power to a square of error.

3. The wireless communication apparatus according to claim 1, wherein the likelihood information estimator calculates likelihood amplitude information according to $$\sqrt{\frac{\hat{S}_l}{\hat{I}_l + \hat{N}_l}},$$

and sends the likelihood amplitude information to the soft decision decoder.

4. The wireless communication apparatus according to claim 1, wherein the likelihood information estimator:
  obtains an amplitude of the estimated likelihood information; and
  multiplies the estimated likelihood amplitude by value by each decoded stream signal.

5. The wireless communication apparatus according to claim 1, wherein:
  each received spatially multiplexed signal is an OFDM modulated signal mapped onto a plurality of subcarriers that are orthogonal to each other on a frequency axis,
  the wireless communication apparatus further comprises a Fourier transformer for Fourier transforming each received spatially multiplexed signal to convert each into a frequency-domain signal, and
  the spatial decoder separates each received spatially multiplexed signal after the Fourier transformation into the individual stream signals by multiplying each received spatially multiplexed signal by the antenna weight matrix.

6. A method for receiving spatially multiplexed signals via respective antennas, the method comprising:
  receiving the spatially multiplexed signals via the respective antennas;
  estimating a channel matrix for spatially multiplexed channels;
  decoding the received spatially multiplexed signals into respective individual stream signals by obtaining an antenna weight matrix from the estimated channel matrix, and multiplying the received spatially multiplexed signals by the antenna weight matrix;
  estimating, for each of the decoded stream signals, likelihood information according to the following equations:

$$\hat{N}_l = \|\dot{w}_l\|^2 \sigma_r^2,$$

$$\hat{S}_l = \|\dot{w}_l \cdot h_l\|^2 - \hat{N}_l, \text{ and}$$

$$\hat{I}_l = \sum_{i=l(i \neq 1)}^{L} \|\dot{w}_l \cdot h_l\|^2 \sigma_r^2,$$

where $\hat{N}_l$ is the noise power of the decoded stream signal, $\hat{S}_l$ is the signal power of the decoded stream signal, $\hat{I}_l$ is the interference power of the decoded stream signal, $h_l$ is a channel vector for the decoded stream signal from the estimated channel matrix, $\dot{w}_l$ is an antenna weight vector for the decoded stream signal from the antenna weight matrix, and $\sigma_r^2$ is an estimated noise power of the respective spatially multiplexed signal, and obtaining a signal-to-interference-and noise ratio (SINR) for a respective stream signal according to $$\sqrt{\frac{\hat{S}_l}{\hat{I}_l + \hat{N}_l}}; \text{ and}$$

performing soft decision decoding on each stream signal based on the SINR of the respective stream signal.

* * * * *